United States Patent [19]

McGahren et al.

[11] 3,914,409

[45] Oct. 21, 1975

[54] AMPHOTERICIN B DERIVATIVES

[75] Inventors: William James McGahren, Demarest, N.J.; Martin Paul Kunstmann, Pearl River, N.Y.

[73] Assignee: American Cyanamid Company, Stamford, Conn.

[22] Filed: Jan. 23, 1974

[21] Appl. No.: 436,007

[52] U.S. Cl. ................................................ 424/119
[51] Int. Cl.² ........................................ A61K 35/00
[58] Field of Search ..................................... 424/119

[56] References Cited
UNITED STATES PATENTS
2,908,611   10/1959   Dutcher et al .................... 424/119

Primary Examiner—Jerome D. Goldberg
Attorney, Agent, or Firm—Edward A. Conroy, Jr.

[57] ABSTRACT

This disclosure describes two new water soluble derivatives of Amphotericin B which possess antifungal activity equal to or greater than the parent Amphotericin B.

1 Claim, 2 Drawing Figures

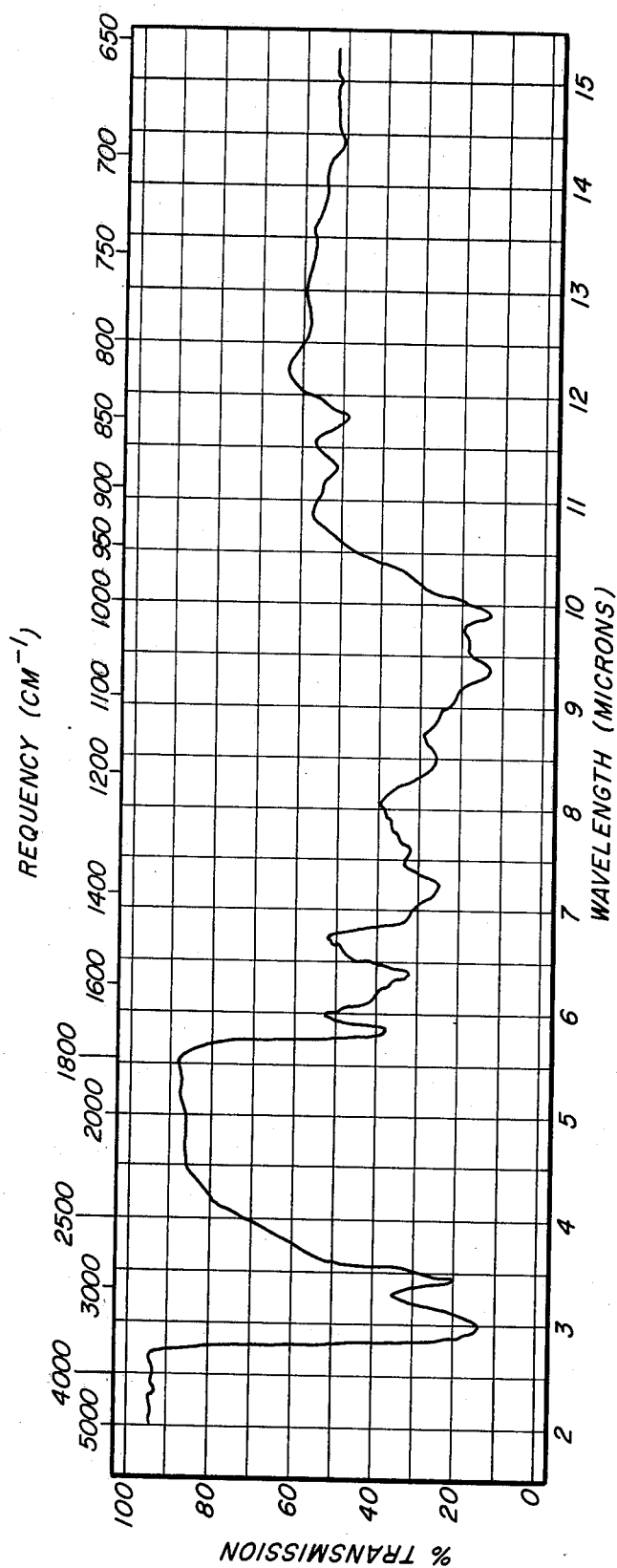

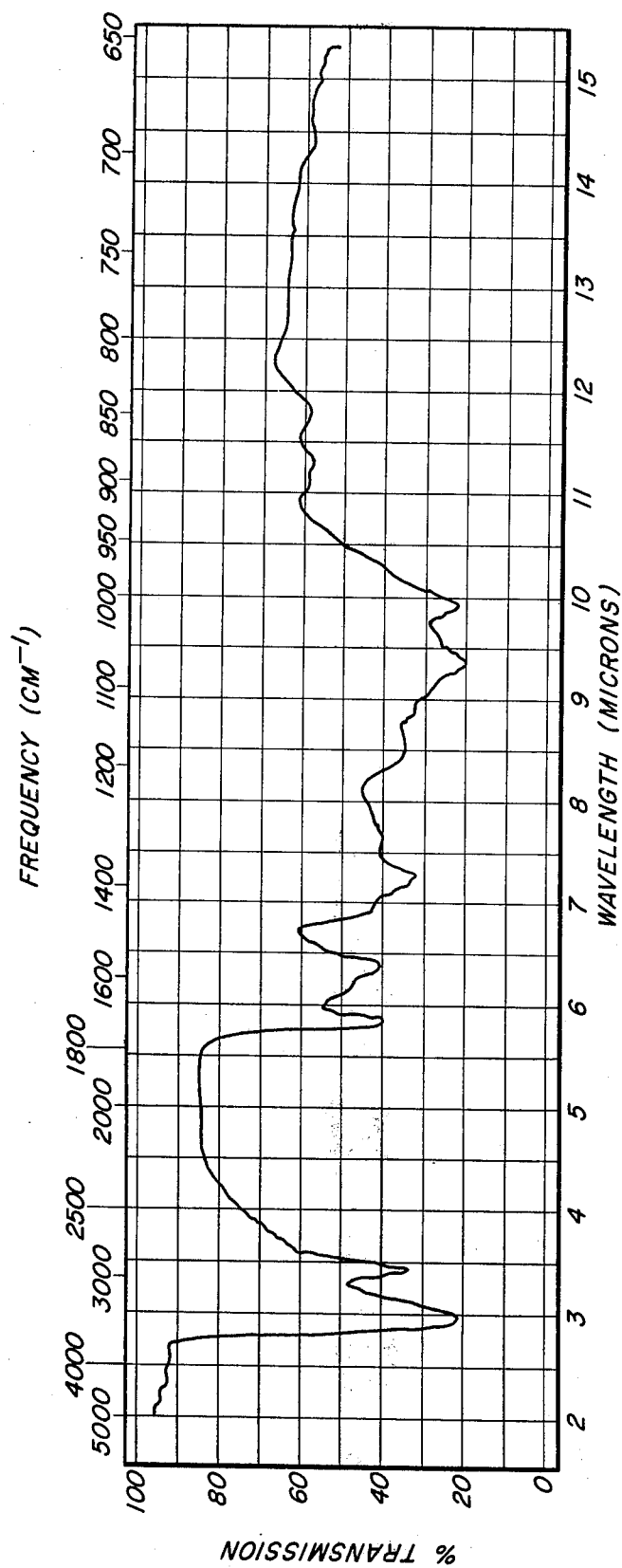

AMPHOTERICIN B DERIVATIVES

BRIEF SUMMARY OF THE INVENTION

This invention relates to a novel group of water soluble derivatives of Amphotericin B and, more particularly, is concerned with ether insoluble derivatives, one of which is an acidic derivative, and the other a neutral derivative of Amphotericin B. The ether insoluble material is prepared by treating Amphotericin B with a stoichiometric amount of dry hydrogen chloride in methanol and recovering by precipitation with diethyl ether. This ether insoluble material is dissolved in water and the pH is adjusted to 3.0–4.0 for the acidic derivative, or to 6.2–6.7 for the neutral derivative, with a basic resin. Lyophilization of the clarified suspensions provides the acidic derivative or the neutral derivative, respectively.

DETAILED DESCRIPTION OF THE INVENTION

Amphotericin B is a polyene macrolide antibiotic which is formed by fermentative biosynthesis during the cultivation under controlled conditions of *Streptomyces nodosus*. The preparation and properties of Amphotericin B are set forth in U.S. Pat. No. 2,908,611 which is hereby incorporated by reference. The structure of Amphotericin B is set forth in the Journal of the American Chemical Society, Vol. 93, No. 18, pp. 4560–4564 (1971) which is also incorporated by reference.

The hydrochloride salt of Amphotericin B is described in U.S. Pat. No. 2,908,611. This salt is prepared by treating a solution of Amphotericin B in dimethylformamide with an equivalent amount of concentrated hydrochloric acid and recovering the product by precipitation with acetone. This salt is only slightly more soluble in water than the free base and the in vitro and in vivo antifungal activities of both are essentially the same. A slurry of the hydrochloride salt of Amphotericin B in water has a pH of 2.5 and upon adjustment of the pH to 7.0 virtually all of the Amphotericin B precipitates.

The hydrochloride salt of the methyl ester of Amphotericin B has been described by Mechlinski & Schaffner, J. Antibiotics 25, 259 (1972). However, the preparative method employed by these authors involves the use of diazomethane, which would render commercial preparation hazardous. Esterification of amino acids is usually accomplished by suspending the amino acid in the appropriate alcohol and then bubbling dry hydrogen chloride through the suspension until solution is effected. The prior art, and in particular the reference cited immediately above, repute polyene macrolide antibiotics to be unstable under such conditions. Contrary to the teachings of the prior art, we have discovered that suspending Amphotericin B in dry methanol and treating this suspension (at 0°–25°C.) with a molar equivalent of hydrogen chloride gas dissolved in dry methanol followed by precipitation with diethyl ether provides a derivative of Amphotericin B which is very soluble in water. This ether insoluble material in water solution at a concentration of about 25 mg./ml. exhibits a pH of about 2.5. It is also not a methyl ester of Amphotericin B as indicated by spectral and thin-layer chromatographic tests.

Upon dissolving the ether insoluble material in water and adjusting the pH of the solution to 3.0–4.0 (at 0°–25°C.) with a basic resin, the dark red solution begins to form a yellow gel. This suspension is clarified by filtration of centrifugation and the clarified liquor is lyophilized to provide the acidic derivative of Amphotericin B as a bright yellow solid. Upon dissolving the ether insoluble material in water and adjusting the pH of the solution to 6.2–6.7 (at 0°–25°C.) with a basic resin, the yellow gel which forms at pH 3.0–4.0 redissolves to give a solution at pH 6.2–6.7. This suspension is clarified by filtration or centrifugation and the clarified liquor is lyophilized to provide the neutral derivative of Amphotericin B as a golden yellow amorphous solid. The basic resin which is employed for pH adjustment may be any water insoluble strong basic resin but preferably one having quaternary ammonium hydroxide groups. A typical basic resin of this kind is Amberlyst A26 which is available from the Rohm & Haas Company of Philadelphia, Pa. Amberlyst A26 is a polystyrene-polyamine type anion exchange resin having macroreticular properties.

The neutral derivative of Amphotericin B is soluble in water to the extent of 25–30 mg./ml. and the pH of its aqueous solution is in the neutral range. Although the acidic derivative of Amphotericin B contains between 1.3% and 1.8% chlorine, the neutral derivative contains no chlorine. Both the acidic derivative and the neutral derivative are as stable as Amphotericin B and both derivatives exhibit antifungal activity equal to or greater than that of Amphotericin B. The ratio of the extinction coefficients at 385 m$\mu$ and 407 m$\mu$ in the ultraviolet for Amphotericin B and the hydrochloride salt of the methyl ester of Amphotericin B is always in the range of 0.870 to 0.890. This may be expressed as follows:

$$\frac{E_{1cm.}^{1\%} \text{ at } 385 \text{ m}\mu}{E_{1cm.}^{1\%} \text{ at } 407 \text{ m}\mu} = 0.870 - 0.890$$

The same ratio for both the acidic derivative and the neutral derivative of Amphotericin B is in the range 0.910 – 0.950.

The in vitro activity of the novel derivatives of the present invention and the comparison with the in vitro activity of prior art compounds was determined by the well known agar diffusion technique against *Candida albicans* and *Cryptococcus neoformans*. The results of these tests are expressed as the extent of the zone of inhibition in millimeters at a specified concentration.

The invention will be described in greater detail in conjunction with the following specific examples.

EXAMPLE 1

Preparation of the Hydrochloride Salt of the Methyl Ester of Amphotericin B

Diazomethane is generated in tetrahydrofuran from the reaction of 16.6 g. of N-methyl-N-nitroso-p-toluenesulfonamide) with 4 g. of KOH in the presence of a small quantity of ethanol. A yellow distillate of 80–85 ml. is collected. A 5 g. portion of Amphotericin B is stirred in 30 ml. of dimethylsulfoxide and cooled to 0°C. The 80–85 ml. of diazomethane solution is added with stirring to the cooled slurry. The resulting dark red solution is run into 600 ml. of stirred diethyl ether. The yellow precipitate which forms is collected by centrifugation and dried yielding 5.0 g. of the methyl ester of Amphotericin B. This ester is suspended in 250 ml. of ice-cold stirred water and 0.1N HCL is added dropwise. The pH is monitored so that it is kept above 5.0. When 42 ml. of acid has been added, virtually all of the material is dissolved giving a straw-colored solution. The reaction contents are centrifuged and the supernatant solution is lyophilized, yielding 4.7 g. of yellow solid product. $E_{1\,cm.}^{1\%}$ at 407 m$\mu$ = 1,400 (CH$_3$OH)

| In vitro activity against Candida albicans | Concentration mg./ml. | Zone of Inhibition mm. |
|---|---|---|
| HCl Salt of the Methyl Ester of Amphotericin B | 200 | 18.3 |
| | 100 | 16.0 |
| | 50 | 14.7 |
| Amphotericin B | 200 | 19.3 |
| | 100 | 17.3 |
| | 50 | 15.7 |

EXAMPLE 2

Preparation of the Conventional Hydrochloride Salf of Amphotericin B

A 4.7 g. portion of Amphotericin B is stirred for 1 hour in 120 ml. of dimethylformamide. A 0.42 ml. portion of concentrated hydrochloric acid is added dropwise resulting in a reddish solution having pH 3.7. This solution is filtered and 1,200 ml. of acetone is added to the filtrate giving a light yellow suspension. The solid is recovered by filtration yielding 12 g. of solvent-wet material which is divided into two parts. One part is dried over P$_2$O$_5$ in vacuo yielding 2.0 g. of dense yellow solid. The second part is stirred in 150 ml. of water to give a suspension from which the acetone is evaporated. Freeze drying yields 1.8 g. of yellow powder. Total chlorine 3.47%; calculated 3.84%. Specific optical rotation: $[\alpha]_D^{25°} = +311° \pm 3.8°$ (C = 0.270 dimethylsulfoxide). $E_{1\,cm.}^{1\%}$ at 407 m$\mu$ = 1,510 (CH$_3$OH). $E_{1\,cm.}^{1\%}$ at 407 m$\mu$ = 1,530 (CH$_3$OH) for Amphotericin B.

EXAMPLE 3

Preparation of the Acidic Derivative of Amphotericin B

Approximately 5 gm. of Amphotericin B are slurried in 25 ml. of dry methanol at 0°C. A solution of dry HCl gas in dry methanol is prepared which is approximately 1M in HCl. An aliquot of 5 ml. of this acidic solution is added dropwise to the slurry with stirring so that essentially all the polyene is in solution. The dark red solution is stirred for a further 15 minutes and the polyene is recovered by precipitation in diethyl ether followed by centrifugation. The ether wet residue is dissolved in 200 ml. of water and Amberlyst A26 [in the hydroxyl form] is added with stirring until the pH is about 4.0. Precipitation of the polyene begins to occur between pH 3.5 and 4.0. The resin is centrifuged off and about one-third of the supernatant is freeze-dried to yield 1.2 gm. of golden yellow fluffy material which is the acidic derivative of Amphotericin B with the following characteristics:

| | |
|---|---|
| Elemental Analysis: | C, 56.42; H, 7.77; N, 1.67; Cl, 1.36. |
| Specific Rotation: | $[\alpha]_D^{25°} = +240°$ (C, 1.08 in dimethylsulfoxide). |
| $E_{1cm.}^{1\%}$ at 407 m$\mu$ = | 1400 (CH$_3$OH). |
| $\dfrac{E_{1cm.}^{1\%} \text{ at } 385}{E_{1cm.}^{1\%} \text{ at } 407 m\mu}$ = | 0.934. |

A standard infrared absorption spectrum of the acidic derivative of Amphotericin B prepared in a KBr disc is shown in FIG. 1 of the accompanying drawings.

| In vitro activity against Candida albicans | Concentration mg./ml. | Zone of Inhibition mm. |
|---|---|---|
| HCl Salt of Amphotericin B | 200 | 16.2 |
| | 100 | 15.3 |
| | 50 | 15.5 |
| Amphotericin B | 200 | 17.0 |
| | 100 | 16.2 |
| | 50 | 15.7 |
| In vitro activity against Crytococcus neoformans | | |
| HCl Salt of Amphotericin B | 200 | 17.5 |
| | 100 | 17.5 |
| | 50 | 17.7 |
| Amphotericin B | 200 | 19.5 |
| | 100 | 18.8 |
| | 50 | 18.0 |

| In vitro activity against Candida albicans | Concentration mg./ml. | Zone of Inhibition mm. |
|---|---|---|
| Amphotericin B | 200 | 18.8 |
| | 100 | 17.5 |
| | 50 | 17.2 |
| Acidic Derivative of Amphotericin B | 200 | 22.9 |
| | 100 | 22.3 |
| | 50 | 21.4 |
| In vitro activity against Cryptococcus neoformans | | |
| Amphotericin B | 200 | 22.9 |
| | 100 | 22.3 |
| | 50 | 21.4 |
| Acidic Derivative of Amphotericin B | 200 | 26.5 |
| | 100 | 26.3 |
| | 50 | 24.7 |

EXAMPLE 4

Preparation of the Acidic Derivative of Amphotericin B

A 9.5 gm. portion of Amphotericin B is suspended in 90 ml. of dry methanol and a solution of 7.6 ml. of 1.32N HCl in methanol (dry gas in methanol) is added. The suspension is stirred until solution is essentially complete. The polyene is recovered by precipitation in diethyl ether followed by centrifugation. The residue is dissolved in 400 ml. of water and the pH is adjusted from 2.5 to 3.1 using Amberlyst A 26 resin (in the hydroxyl form). Freeze drying yields 8.0 gm. of light yellow powder with the following characteristics:

Elemental Analysis: C, 56.04; H, 7.56; N, 1.51; Cl, 1.73.
Specific Rotation: $[\alpha]_D^{25°} = +250°$ (C, 0.258 in dimethylsulfoxide).

$E_{1cm.}^{1\%}$ at 407 m$\mu$ = 1490 (CH$_3$OH).

$\dfrac{E_{1cm.}^{1\%} \text{ at } 385 \text{ m}\mu}{E_{1cm.}^{1\%} \text{ at } 407 \text{ m}\mu} = 0.920.$

EXAMPLE 5

Preparation of the Neutral Derivative of Amphotericin B

A 10 gm. portion of Amphotericin B is slurried in 80 ml. of dry methanol and 12 ml. of a solution which is 1.1N in dry HCl gas in methanol is added. This suspension is filtered and the polyene is recovered from the filtrate by precipitation in diethyl ether and centrifugation. The ether wet residue is dissolved in 500 ml. of water and the pH is adjusted to 6.7 with Amberlyst resin. The resin is removed by filtration and, following evaporation of the ether, the filtrate is freeze-dried yielding 8.0 gm. of product with the following characteristics:

Elemental Analysis: C, 56.71; H, 7.62; N, 1.46; Cl, 0.0.
Specific Rotation: $[\alpha]_D^{25°} = +225°$ (C, 0.331 in dimethylsulfoxide).

$E_{1cm.}^{1\%}$ at 407 m$\mu$ = 1370 (CH$_3$OH).

$\dfrac{E_{1cm.}^{1\%} \text{ at } 385 \text{ m}\mu}{E_{1cm.}^{1\%} \text{ at } 407 \text{ m}\mu} = 0.926.$ A standard infrared absorption spectrum of the neutral derivative of Amphotericin B prepared in a KBr disc is shown in FIG. 2 of the accompanying drawings.

| In vitro activity against Candida albicans | Concentration mg./ml. | Zone of Inhibition mm. |
|---|---|---|
| Acidic Derivative of Amphotericin B | 200 | 18.7 |
|  | 100 | 17.3 |
|  | 50 | 16.8 |
| Amphotericin B | 200 | 17.8 |
|  | 100 | 17.3 |
|  | 50 | 17.2 |
| In vitro activity against Cryptococcus neoformans |  |  |
| Acidic Derivative of Amphotericin B | 200 | 19.5 |
|  | 100 | 19.3 |
|  | 50 | 18.7 |
| Amphotericin B | 200 | 19.3 |
|  | 100 | 18.8 |
|  | 50 | 18.8 |

| In vitro activity against Candida albicans | Concentration mg./ml. | Zone of Inhibition mm. |
|---|---|---|
| Neutral Derivative of Amphotericin B | 200 | 22.3 |
|  | 100 | 21.0 |
|  | 50 | 19.8 |
| Methyl ester HCl salt of Amphotericin B | 200 | 18.5 |
|  | 100 | 17.5 |
|  | 50 | 17.0 |
| Fungizone * | 200 | 18.2 |
|  | 100 | 17.0 |
|  | 50 | 16.8 |
| In vitro activity against Cryptococcus neoformans |  |  |
| Neutral Derivative of Amphotericin B | 200 | 24.5 |
|  | 100 | 24.3 |
|  | 50 | 22.3 |
| Methyl ester HCl salt of Amphotericin B | 200 | 22.2 |
|  | 100 | 22.8 |
|  | 50 | 22.0 |
| Fungizone * | 200 | 18.3 |
|  | 100 | 19.0 |
|  | 50 | 18.7 |

* Fungizone is an approximately 1:1 mixture of Amphotericin B and sodium desoxycholate. Concentration of Amphotericin B in Fungizone is calculated to allow for presence of sodium desoxycholate diluent.

EXAMPLE 6

Stability Studies on Amphotericin B Derivatives

Solutions of 10 mg./ml. in water of the following materials were made:
1. Fungizone
2. Amphotericin B Methyl Ester Hydrochloride
3. Neutral Derivative of Amphotericin B The solutions were placed in capped amber bottles at ambient temperature. The solutions were sampled for bioassay by shaking the bottle and removing 0.2 ml. The 0.2 ml. was added to 0.8 ml. of dimethylsulfoxide and diluted to 10 ml. with water. For UV testing, 0.1 ml. samples were taken, added to 0.9 ml. of dimethylsulfoxide and then diluted to 5 mcg./ml. with methanol. A tabulation of the stability results appear in the following Table.

to about 7.2 with 0.2M NaOH solution. The resulting yellow dispersion was centrifuged and the supernatant solution was freeze-dried to yield 0.85 gm. of yellow powder labelled R. THe slurry-residue was dissolved in dimethylsulfoxide and the polyene precipitated with acetone to yield upon drying 0.6 gm. of solid labelled S.

| Material | Weight in gm. | $\frac{E_{1cm.}^{1\%} \text{ at } 385 \, m\mu}{E_{1cm.}^{1\%} \text{ at } 407 \, m\mu}$ |
|---|---|---|
| P | 0.18 | 0.875 |
| Q | 1.30 | 0.870 |
| R | 0.85 | 0.948 |
| S | 0.60 | 0.918 |

Stability Studies on Aqueous Solutions of Amphotericin B Derivatives

| Compound | Test | Day 0 | Day 4 | Day 7 | Day 14 | Day 21 | Day 35 | Day 49 | Day 63 |
|---|---|---|---|---|---|---|---|---|---|
| Fungizone | In vitro C. albicans | 18.2 | 16.3 | 17.0 | 16.3 | 16.7 | 16.8 | 16.8 | 15.0 |
| | In vitro C. neoformans | 18.3 | 18.3 | 17.3 | 16.3 | 17.5 | 17.0 | 16.5 | 17.0 |
| | $E_{1cm.}^{1\%}$ at 407 m$\mu$ | 1560 | 1600 | 1580 | 1460 | 1520 | 1160 | 1340 | |
| Amphotericin B Methyl Ester Hydrochloride | In vitro C. albicans | 17.8 | 18.0 | 17.0 | 14.7 | 14.3 | 14.0 | 13.7 | 12.0 |
| | In vitro C. neoformans | 20.2 | 21.0 | 19.7 | 16.8 | 16.0 | 14.8 | 13.7 | 13.5 |
| | $E_{1cm.}^{1\%}$ at 407 m$\mu$ | 1380 | 800 | 450 | 240 | 170 | 105 | 95 | |
| Neutral Derivative of Amphotericin B | In vitro C. albicans | 22.3 | 20.0 | 20.0 | 18.2 | 18.0 | 17.3 | 17.5 | 16.3 |
| | In vitro C. neoformans | 24.5 | 23.3 | 21.0 | 20.7 | 19.5 | 18.5 | 19.7 | 17.7 |
| | $E_{1cm.}^{1\%}$ at 407 m$\mu$ | 1460 | 1300 | 1310 | 1030 | 1040 | 960 | 1020 | |

In vitro results given as zones of inhibition in mm.

EXAMPLE 7

To Illustrate the Difference Between the Acidic Derivative of Amphotericin B and the Conventional Hydrochloride Salt of Amphotericin B With Regard to Water Solubility Upon Neutralization a. Neutralization of HCl salt of Amphotericin B: About 1.9 gm. of the HCl salt of Amphotericin B was stirred in 100 ml. of H$_2$O to give a dispersion exhibiting a pH of 2.5. The pH was adjusted upward to 7.0 using 0.2M NaOH solution. The resultant suspension was centrifuged. The supernatant yellow dispersion was freeze-dried to yield 180 mg. of yellow solid labelled P. The residue from centrifugation was washed with acetone and diethyl ether and dried in vacuo to yield 1.3 gm. of yellow solid labelled Q.

b. Neutralization of acidic derivative of Amphotericin B: Approximately 1.9 gm. of the acidic derivative of Amphotericin B was dissolved in 100 ml. of H$_2$O to give a solution at pH 3.0. The pH was adjusted upward

EXAMPLE 8

In vivo Activity of Amphotericin B Derivatives

Infection: Unit test groups, consisting of 5 or 10 Carworth Farms CF1 white female mice (18-22 gm.) were infected by intravenous injection of 0.2 ml. of a 1:20 broth dilution of *Cryptococcus neoformans* or a 1:40 broth dilution of *Candida albicans*. The dilutions were made from a trypticase soy broth culture incubated at 30°C. on a rotary shaker for 72 hours in the case of *Cryptococcus neoformans* and for 24 hours in the case of *Candida albicans*.

Treatment: Mice were treated within 1 hour after initiation of infection with 0.5 ml. of drug suspension in sterile distilled water or 0.2% aqueous agar, administered intraperitoneally. Tests were observed and results recorded for 21 days.

The results for Amphotericin B derivatives appear in the following tables.

TABLE 1

In vivo Activity Against *Candida albicans*
Alive/Total Mice Tested 21 Days After Infection

| Intraperitoneal Dose mg./kg. | Amphotericin B Acidic Derivative | Amphotericin B Neutral Derivative | Amphotericin B |
|---|---|---|---|
| 200 | | | 18/20 |
| 50 | | | 10/20 |
| 12.5 | 20/20 | 19/20 | 5/20 |
| 3.1 | 20/20 | 20/20 | 3/20 |
| 0.8 | 11/20 | 9/20 | |
| 0.2 | 0/20 | 1/20 | |
| Infected non-treated controls | | 0/80 | |

TABLE 2

| Intraperitoneal Dose mg./kg. | In vivo Activity Against *Cryptococcus neoformans* Alive/Total Mice Tested 21 Days After Infection | | |
|---|---|---|---|
| | Amphotericin B Acidic Derivative | Amphotericin B Neutral Derivative | Amphotericin B |
| 200 | | | 18/20 |
| 50 | | | 11/20 |
| 12.5 | 20/20 | 19/20 | 0/20 |
| 3.1 | 5/20 | 5/20 | 0/20 |
| 0.8 | 0/20 | 3/20 | |
| 0.2 | 0/20 | 0/19 | |
| Infected non-treated controls | 0/110 | | |

We claim:

1. A neutral derivative of Amphotericin B, a compound which
   a. is water soluble to the extent of 25–30 mg./ml. and is effective in inhibiting the growth of fungi; and in its essentially pure amorphous form
   b. has an optical rotation $[\alpha]_D^{25°} = +225° - +240°$ (in dimethylsulfoxide);
   c. has the following elemental analysis (percent): C, 56.71; H, 7.62; N, 1.46;
   d. has the following ratio of extinction coefficients in the ultraviolet:

$$\frac{E_{1cm.}^{1\%} \text{ at } 385 \text{ m}\mu}{E_{1cm.}^{1\%} \text{ at } 407 \text{ m}\mu} = 0.910 - 0.950; \text{ and}$$

e. has a characteristic infrared absorption spectrum as shown in FIG. 2 of the drawings.

* * * * *